US008205062B2

(12) United States Patent
Rushworth et al.

(10) Patent No.: US 8,205,062 B2
(45) Date of Patent: Jun. 19, 2012

(54) TIERED DATA MANAGEMENT METHOD AND SYSTEM FOR HIGH PERFORMANCE DATA MONITORING

(75) Inventors: Thomas Bryan Rushworth, Manning Park (CA); Angus Richard Telfer, Vancouver (CA)

(73) Assignee: Inetco Systems Limited, Burnaby (CA)

( * ) Notice: Subject to any disclaimer, the term of this patent is extended or adjusted under 35 U.S.C. 154(b) by 344 days.

(21) Appl. No.: 12/578,746

(22) Filed: Oct. 14, 2009

(65) Prior Publication Data
US 2011/0087854 A1    Apr. 14, 2011

(51) Int. Cl.
*G06F 12/02* (2006.01)
(52) U.S. Cl. .. 711/171; 711/118; 711/147; 711/E12.002
(58) Field of Classification Search .................. None
See application file for complete search history.

(56) References Cited

U.S. PATENT DOCUMENTS

| | | | | |
|---|---|---|---|---|
| 5,548,751 | A * | 8/1996 | Ryu et al. ..................... | 711/171 |
| 6,578,129 | B1 * | 6/2003 | da Silva Junior et al. .... | 711/209 |
| 6,640,290 | B1 | 10/2003 | Forin et al. | |
| 7,603,366 | B1 * | 10/2009 | Gritsay et al. ................ | 709/224 |
| 2005/0021923 | A1 * | 1/2005 | Von Bergen et al. ......... | 711/171 |
| 2006/0053421 | A1 * | 3/2006 | Dickenson .................... | 718/100 |
| 2008/0104086 | A1 | 5/2008 | Bare et al. | |
| 2008/0235366 | A1 | 9/2008 | Telfer et al. | |
| 2010/0122036 | A1 * | 5/2010 | Radovic et al. ............... | 711/118 |

OTHER PUBLICATIONS

International Searching Authority, Written Opinion and International Search Report for PCT/CA2010/001572, Mailed January 14, 2011.
Appavoo et al., "Enabling Scalable Performance for General Purpose Workloads on Shared Memory Multiprocessors", IBM Research Report, Jul. 30, 2003.
Bonwick et al., "The Slab Allocator: An Object-Caching Kernel Memory Allocator", 1994 USENIX Summer, pp. 87-98, 1994.
Drepper, Ulrich, "What Every Programmer Should Know About Memory", Red Hat, Inc., Nov. 21, 2007.
Duffield et al., "PSAMP Framework Document", PSAMP WG IETF, Mar. 2003.
Krieger et al., "K42: Building a Complete Operating System", EuroSys'06, Apr. 18-22, 2006.
Krieger et al., "K42: Building a Complete OS", http://www.research.ibm.com/K42, EuroSys'06, Apr. 18-22, 2006.

* cited by examiner

*Primary Examiner* — Michael Krofcheck
(74) *Attorney, Agent, or Firm* — Joseph Conneely; McCarthy Tetrault LLP

(57) ABSTRACT

A method for managing memory in a system for an application, comprising: assigning a first block (i.e., a big block) of the memory to the application when the application is initiated, the first block having a first size, the first block being assigned to the application until the application is terminated; dividing the first block into second blocks (i.e., intermediate blocks), each second block having a same second size, a second block of the second blocks for containing data for one or more components of a single data structure to be accessed by one thread of the application at a time; and, dividing the second block into third blocks (i.e., small blocks), each third block having a same third size, a third block of the third blocks for containing data for a single component of the single data structure.

34 Claims, 9 Drawing Sheets

TIERED DATA MANAGEMENT METHOD AND SYSTEM FOR HIGH PERFORMANCE DATA MONITORING

FIELD OF THE INVENTION

This invention relates to the field of data management, and more specifically, to a tiered data management method and system for high performance data monitoring.

BACKGROUND OF THE INVENTION

Modern hardware computing platforms offer many new capabilities and capacities over older hardware. They are multi-core, capable of supporting very large amounts of shared memory, and are designed for multi-thread operation. Being able to fully utilize these features allows the ability to run very high performance, scalable, and real time applications on inexpensive hardware. Taking full advantage of these benefits requires the integration of the operating system functionality into the application.

In particular, multi-core hardware computing platforms have the potential of providing a real multiplier in computing power due to their multi-core nature and very high speed memory access due to the large caches dedicated to each of these cores. There are several significant challenges in realizing the full potential of this hardware. The primary ones involve how to avoid data cache thrashing, how to prevent data in shared memory from being updated by multiple processor cores simultaneously, and how to spread the load evenly over the available processors. A general purpose operating system has generic algorithms for all of the above which take no account of application specific behaviours. This results in sub-optimal utilization of the resources mentioned above.

Current practice for optimal use of available multi-core computer resources involves one of the following approaches. First, the application may be hard coded to directly control its own scheduling with a minimal executive for hardware access (i.e., integrating key operating system functionality into the application). Done properly, this can result in very efficient use of the multi-core hardware. However, such applications are difficult to program and have little flexibility. Developing them is expensive, time consuming, and prone to error as it requires programmers to develop the application directly for the underlying hardware architecture (something that is generally abstracted by the operating system).

Second, the application may be implemented by dividing it into application subsystems, each with its own data storage and executable. This is often done by a horizontal scaling technique whereby data is streamed between the different subsystems. This approach is quite common in event processing applications where memory can be segregated among the application subsystems. However, such segmentation avoids global access to shared memory resulting in data duplication, increased latency, and much, otherwise unnecessary, encoding and decoding of data for transfer between the different subsystems.

Third, the data may be divided horizontally into different memory pools with a different processor, each executing the same application, being responsible for each memory pool. This is reasonably efficient if the data can be broken down in that way, but requires additional processing to route requests to the correct "pool", doesn't solve any issues with shared memory, and increases overall latency. Scaling is accomplished by breaking the data into more pools and adding more processors.

Fourth, some operating systems make use of "slab" allocators for memory management where memory allocation requests for identical sized chunks of memory are grouped into slabs. This allows a reduction of memory fragmentation and use of free lists for allocation. Unfortunately, such allocators are more likely to have cache thrashing as the active data is spread out over large regions of memory as a result of the data not being segregated with application specific knowledge of use or expected lifetime.

A need therefore exists for an improved data management method and system. Accordingly, a solution that addresses, at least in part, the above and other shortcomings is desired.

SUMMARY OF THE INVENTION

According to one aspect of the invention, there is provided a method for managing memory in a system for an application, comprising: assigning a first block (i.e., a big block) of the memory to the application when the application is initiated, the first block having a first size, the first block being assigned to the application until the application is terminated; dividing the first block into second blocks (i.e., intermediate blocks), each second block having a same second size, a second block of the second blocks for containing data for one or more components of a single data structure to be accessed by one thread of the application at a time; and, dividing the second block into third blocks (i.e., small blocks), each third block having a same third size, a third block of the third blocks for containing data for a single component of the single data structure.

The method may further include: associating a block manager (i.e., an intermediate block manager) with the second block for dividing the second block into the third blocks. Each second block may be associated with a respective block manager. The same third size of each third block of the second block may differ from a same third size of each third block of another of the second blocks. The method may further include: if the single component is associated with variable length data: assigning a fourth block (i.e., a payload allocation block) of the memory to the application when the application is initiated, the fourth block having a fourth size, the fourth block being assigned to the application until the application is terminated; dividing the fourth block into portions (i.e., chunks), each portion having a variable size, the variable size being indicated at both a start and an end of the portion; and, establishing a pointer from the third block to a portion of the fourth block, the portion for containing the variable length data of the single component, the third block for containing the pointer. The method may further include: maintaining a list of second blocks within the first block that are empty; identifying the second block from the list of second blocks as being empty; storing the data for the single data structure in the second block when required by the application and removing the second block from the list of second blocks; and, deleting the data for the single data structure from the second block when no longer required by the application and adding the second block to the list of second blocks. The method may further include: maintaining a list of third blocks within the second block that are empty; identifying the third block from the list of third blocks as being empty; storing the data for the single component in the third block when required by the application and removing the third block from the list of third blocks; and, deleting the data for the single component from the third block when no longer required by the application and adding the third block to the list of third blocks. In the above method, the first size may be greater than the second size and the second size may be greater than the third size. The second size may be an integer multiple of a cache line size of a cache memory of a processor core of the system. The list of second blocks may be a push-down list and each second block may contain a pointer for use by the list of second blocks and a data region. The list of third blocks may be a push-down list and each third block may contain a pointer for use by the list of third blocks or a data region. A data region of the third block may contain the data for the single component if the data for that component is fixed-length data. A data region of the third block may include a pointer to another location in the memory for storing the data for the single component if the data for that component is variable-length data. The application may be a message monitoring application, the single data structure may be associated with a message, and the single component may be associated with a field of the message containing network and/or application information. The method may further include extracting data from the message and storing the data in the second and third blocks. The application may have two or more threads. The system may have two or more processor cores, each processor core running only one of the two or more threads at a time. And, the memory may be a cache memory of a processor core of the system.

In accordance with further aspects of the present invention there is provided an apparatus such as a data processing system, a method for adapting this system, as well as articles of manufacture such as a computer readable medium (or product) having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
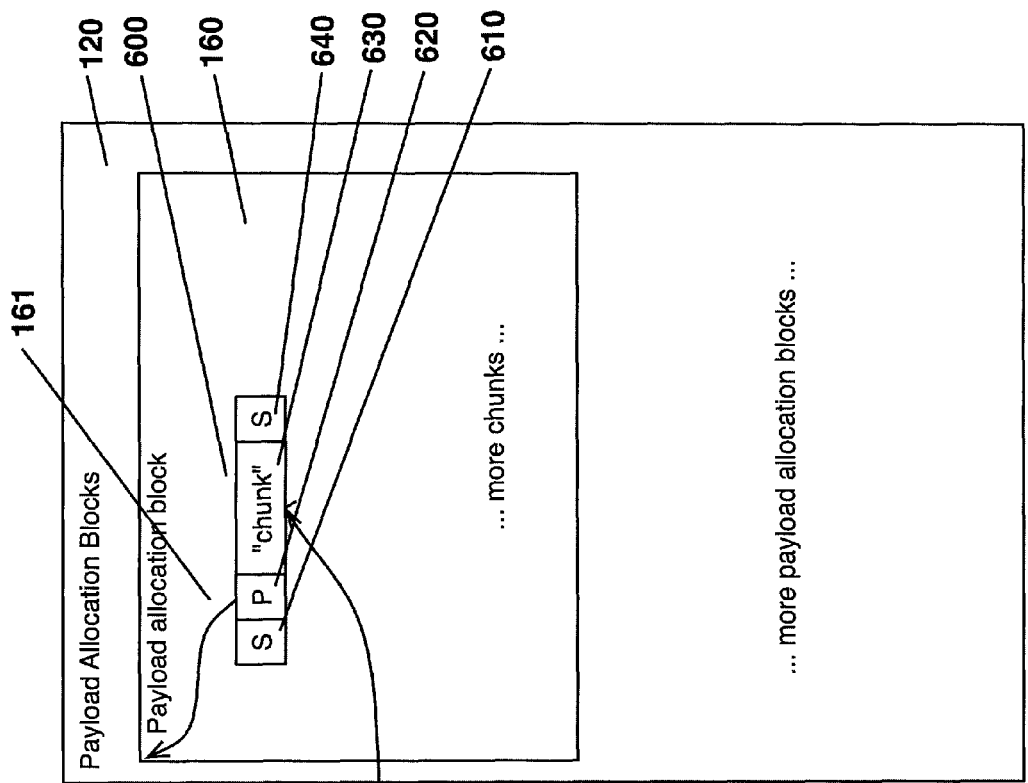
FIG. 1 is a block diagram illustrating the physical layout of a tiered memory allocation block system for a data processing system in accordance with an embodiment of the invention.
Figure 1:
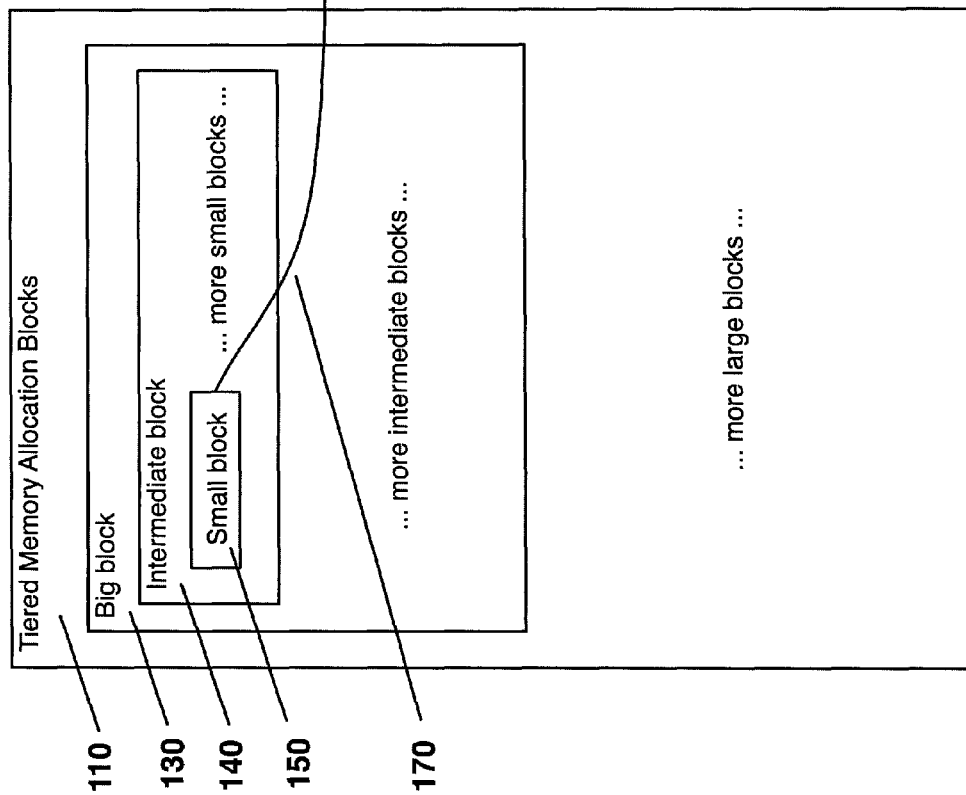

In the following description, details are set forth to provide an understanding of the invention. In some instances, certain software, circuits, structures and techniques have not been described or shown in detail in order not to obscure the invention. The term "data processing system" is used herein to refer to any machine for processing data including the computer systems described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

The term "ABA problem" is used herein to refer to a problem encountered when implementing a lock-free data structure within a multi-threaded environment. For example, if an item is removed from a list, modified, and added to the list, it is possible for the next pointer to have changed without the first thread being aware of it, leading to list corruption.

The term "AVL tree" is used herein to refer to a self-balancing binary search tree. In an AVL tree, the heights of the two child subtrees of any node differ by at most one. Therefore, it is also said to be height-balanced. Lookup, insertion, and deletion all take "O(log n)" time in both the average and worst cases, where "n" is the number of nodes in the tree prior to the operation.

The term "cache line" is used herein to refer to the smallest unit of memory than can be transferred between the main memory and the cache. Rather than reading a single word or byte from main memory at a time, each cache entry usually holds a certain number of words, known as a "cache line" or "cache block" and a whole line is read and cached at once. This takes advantage of the principle of locality of reference, this is, if one location is read then nearby locations (particularly following locations) are likely to be read soon afterward. It can also take advantage of page-mode dynamic random access memory which allows faster access to consecutive locations.

The term "CEP" is used herein to refer to an event processing concept that deals with the task of processing multiple events from an event cloud with the goal of identifying the meaningful events within the event cloud. CEP employs techniques such as detection of complex patterns of many events, event correlation and abstraction, event hierarchies, and relationships between events such as causality, membership, and timing, and event-driven processes.

The term "critical section" is used herein to refer to a section of instructions for a given thread that must be executed (from the viewpoint of any other threads) as if all the instructions happened without intervening actions from other threads.

The term "data structure" is used herein to refer to a group of data "components" which are closely related. In the present invention, data structures may include data messages, groups of data messages, data packets, or name tables. The list of all free intermediate blocks is also a data structure.

The term "field" is used herein to refer to one possible instance of a data structure. Each field has a name, a set of attributes, and a value.

The term "field set" is used herein to refer to a data structure consisting of multiple fields where each field is a component of that data structure.

The term "lock-free" (or "non-blocking") is used herein to refer to a data structure implementation where after a finite number of steps of any thread operating on the data structure, some thread (not necessarily the same one) operating on the data structure completes.

The term "mutex" is used herein to refer to a mechanism (e.g., such as semaphores) for ensuring "mutual exclusion" as a means of implementing critical sections.

The term "payload" is used herein to refer to the actual useful data, usually variable length, being stored according to the present invention excluding the overhead of the tiered data management system.

The term "skip list" is used herein to refer to a probabilistic data structure, based on parallel linked lists, with efficiency comparable to a binary search tree (i.e., order "log n" average time for most operations).

And, the term "thread" (or "thread of execution") is used herein to refer to a set of instructions being interpreted (i.e., executed) by a CPU or CPU core. A thread usually has some small amount of private (to the thread) memory, and otherwise shares most of memory with other threads.

The present invention provides an improved data management method and system. In particular, the invention provides a data management system that offers performance enhancements over current techniques in multi-core, multi-thread environments by taking advantage of application specific knowledge. It is useful for those applications that access large amounts of in-memory data which can be organized hierarchically (e.g., where distinct data elements or "fields" can be associated with higher level data structures or "field sets"). Such applications include those involving data monitoring, analysis, and/or tracking such as real-time message content switches, message format converters, fraud monitors, application firewalls, business process analysis applications, and network data analyzers.

In particular, a class of applications exist that require high performance and share certain characteristics. First, they require access to large amounts of in-memory data. This data may be computed data (e.g., points in a graph, a simulated 3D face, etc.), monitored data (e.g., monitored data traffic, sensor information, etc.), or data retrieved from a database that has to be analyzed (e.g., geographical information systems, data points, etc.). Second, the in-memory data can be characterized by a hierarchical structure whereby the individual data points (i.e., "fields", etc.) can be associated with a higher level structure (i.e., messages, data organized as rows, columns, and/or tables, etc.).

For these types of applications, a real-time, tiered data management system such as that provided by the invention allows for optimal use of multi-core hardware without requiring tight integration of the application and operating system. This tiered data management system can be used to implement a "datastore" (e.g., 710 in FIG. 7) that acts as a repository for the application's data and the structures relating to it. Individual application components can then create, read, write, alter, and delete data in this datastore. The invention allows the resulting application to be highly efficient in multi-core environments even though the different application components have no knowledge of the underlying hardware. It also offers specific improvements over standard approaches in the areas of direct memory access, memory fragmentation, memory cache performance, and multiple thread operation. These same advantages cannot be gained directly from general purpose operating systems (e.g., Linux™, MAC OS X™, the different versions of Microsoft Windows™, etc.) for the following reasons. First, these general purpose operating systems must do memory allocation without any knowledge of the data being stored. As such, they result in large performance hits due to memory fragmentation and compaction operations which occur as application data structures and their components are created, modified, and deleted. Second, general purpose operating systems cannot maximize the use of large per core memory caches as they have no knowledge of the format of the data structures that will be accessed. The result is memory cache thrashing. This negates many of the performance advantages that multi-core hardware was meant to confer. Third, to take full advantage of the multiple processor cores, it must be possible to achieve lock-free operation. This is not possible in general purpose operating systems as, again, there is no underlying knowledge of the data structure. The result is that low level memory access functions must use mutexes and other locking arbitration schemes which effectively force the system back into a single processor core mode.

Figure 8:
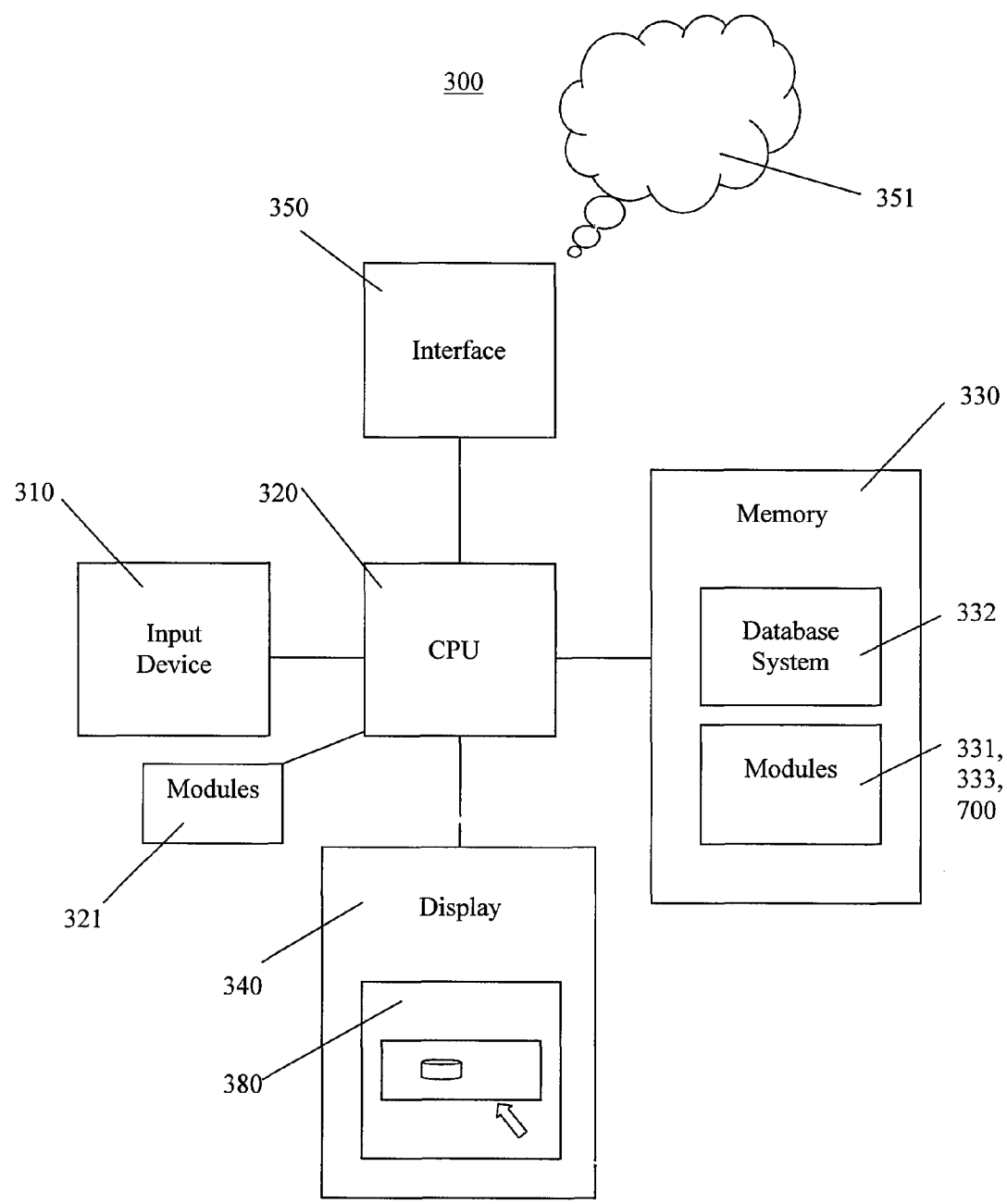
FIG. 8 is a block diagram illustrating a data processing system in accordance with an embodiment of the invention; and, FIG. 9 is a flow chart illustrating operations of modules within a data processing system for managing memory in the system for an application, in accordance with an embodiment of the invention.

FIG. 8 is a block diagram illustrating a data processing system 300 in accordance with an embodiment of the invention. The data processing system 300 may be a server system or a personal computer ("PC") system and is suitable for operation as a network device. The data processing system 300 includes a central processing unit ("CPU") 320, memory 330, and an interface device 350 and may optionally include an input device 310 and a display 340. The CPU 320 may be a multi-core processor. The CPU 320 may include or be operatively coupled to additional processors, dedicated coprocessors, memory devices, or other hardware modules 321. The CPU 320 is operatively coupled to memory 330 which stores an operating system (e.g., 331) for general management of the system 300, executable code for the system (e.g., 333), configuration information, data stores, etc. The memory 330 may include RAM, ROM, disk devices, flash memory, etc. The memory 330 may include a variety of storage devices including internal memory and external mass storage typically arranged in a hierarchy of storage as understood to those skilled in the art. The interface device 350 may include one or more connections including local area network connections, dial network connections, wireless network connections, file system connections, database connections, messaging connections, operating system "pipe" connections, connections via shared memory, etc. The data processing system 300 may be adapted for communicating with other data processing systems (e.g., similar to data processing system 300) over a network 351 via the interface device 350. The input device 310 may include a keyboard, a mouse, a trackball, or a similar device. The display 340 may include a computer screen, terminal device, or a hardcopy producing output device such as a printer or plotter. The CPU 320 may be operatively coupled to one or more input devices 310 for receiving user commands or queries and for displaying the results of these commands or queries to the user on the display 340. Commands and queries may also be received over a network connection, and results may be transmitted over a network connection. The data processing system 300 may include a database system 332 (or store) for storing data and programming information. The database system 332 may include a database management system ("DBMS") and a database and may be stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules 321 or software modules 331, 333 resident in the memory 330 of the data processing system 300 or elsewhere (e.g., 320, 321). Alternatively, the programmed instructions may be embodied on a computer readable medium (or product) (e.g., a compact disk ("CD"), a flash memory, a floppy disk, etc.) which may be used for transporting the programmed instructions to the memory 330 of the data processing system 300. Alternatively, the programmed instructions may be embedded in a computer-readable signal or signal-bearing medium (or product) that may be uploaded to a network 351 by a vendor or supplier of the programmed instructions, and this signal or signal-bearing medium (or product) may be downloaded through an interface (e.g., 350) to the data processing system 300 from the network 351 by end users or potential buyers.

Optionally, a user may interact with the data processing system 300 and its hardware 321 and software modules 331 using a user interface ("UI") 380. The UI 380 may be used for monitoring, managing, and accessing the data processing system 300. UIs are supported by common operating systems and provide a format which enables a user to choose commands, execute application programs, manage computer files, and perform other functions selected from a menu through use of an input or pointing device such as a keyboard or mouse 310 or by entering a command.

According to one embodiment, the data processing system 300 may be coupled (e.g., by network 351) to one or more similar systems 300 to form a multi-core system or platform.

FIG. 1 is a block diagram illustrating the physical layout of a tiered memory allocation block system 100 for a data processing system 300 in accordance with an embodiment of the invention. According to one embodiment, the invention provides a tiered method for allocating and managing memory 330. There are two primary memory mechanisms involved in implementing this embodiment. The first pertains to tiered memory allocation itself (i.e., to a "tiered memory allocation block structure" 110) and to small, fixed size application data elements. The second pertains to variable sized payloads within data structure components (i.e., to "chunks within a payload allocation block" 120). FIG. 1 shows a physical layout of how these two mechanisms are related.

The tiered memory allocation block structure 110 consists of three tiers of memory blocks, each contained within the other. These are referred to herein as "big blocks" 130, "intermediate blocks" 140, and "small blocks" 150. These blocks are used as follows.

The "big blocks" 130 are obtained from the operating system (e.g., 331) when an application (e.g., 333) is first initialized. In systems that are not as real-time critical, this may also occur dynamically. Typically, big blocks 130 would be one Mbyte or larger in size. Big blocks 130 are generally never released to ensure that memory fragmentation and compaction do not occur due to such release. The allocation of big blocks 130 minimizes interaction with the operating system's memory management scheme and so avoids (or minimizes in the case of allowing dynamic initialization) the allocation time, memory fragmentation, and compaction issues that would otherwise be encountered.

Each big block 130 is divided into equal sized "intermediate blocks" 140. The size of these intermediate blocks 140 is chosen so as to be an integer multiple of the memory "cache line" size (e.g., 512 bytes) to maximize memory cache behaviour. Unlike with other memory management systems (which use multiple sized blocks for data), these, intermediate blocks 140 implement the actual block management strategy as well as storing small, fixed size data structures and data. Each intermediate block 140 contains data from only a single data structure (e.g., a field set, a single data message, a structure containing reference to a group of related data messages, cursors for moving between data structures, name tables for data elements, etc.) although a data structure may span multiple intermediate blocks 140. Note that the use of equal sized intermediate blocks 140 reduces or eliminates memory fragmentation of the big blocks 130, again avoiding memory fragmentation and compaction overheads. Management (i.e., allocation and de-allocation) of intermediate blocks 140 is done by simple push-down lists. This allows the use of lock-free algorithms, resulting in the ability to avoid locking mechanisms (e.g., mutexes, etc.) and so maximizing the efficiency gains from multi-core processors 320. Intermediate blocks 140 contain a data region 141 (for an array of identical small blocks 150) and a single pointer 142 for an intermediate block manager's (described below) list of intermediate blocks B.

Each intermediate block 140 is divided into a number of equal sized "small blocks" 150 each having a data region 151 or a pointer 152. Each small block 150 contains one individual application data structure (e.g., a field, a "C" language "struct" or similar element, etc.). Note that the size of these small blocks 150 may be different for different intermediate blocks 140. With respect to small fixed size data, the contents of the data structure component are typically stored within the small block 150 itself. For example, with respect to data message fields, fields that are integers, single characters, or other fixed lengths will typically be stored directly in the small block 150 along with its attributes. Fields that are of large variable length (e.g., strings) will have their attributes stored in the small block 150 along with a direct pointer 170 to a "chunk" 600 within a payload allocation block 200 (described below).

This method may have the following advantages. First, it increases the probability of a cache line hit as typically a single data structure will be worked on at a time. Second, it reduces the probability of cache line thrashing as, again, typically a single data structure will be worked on at a time (i.e., no other data structure being looked at by other threads will have components in the same intermediate blocks 140). Third, it makes it possible to recover the intermediate blocks 140 efficiently when a data structure is deleted.

Figure 2:
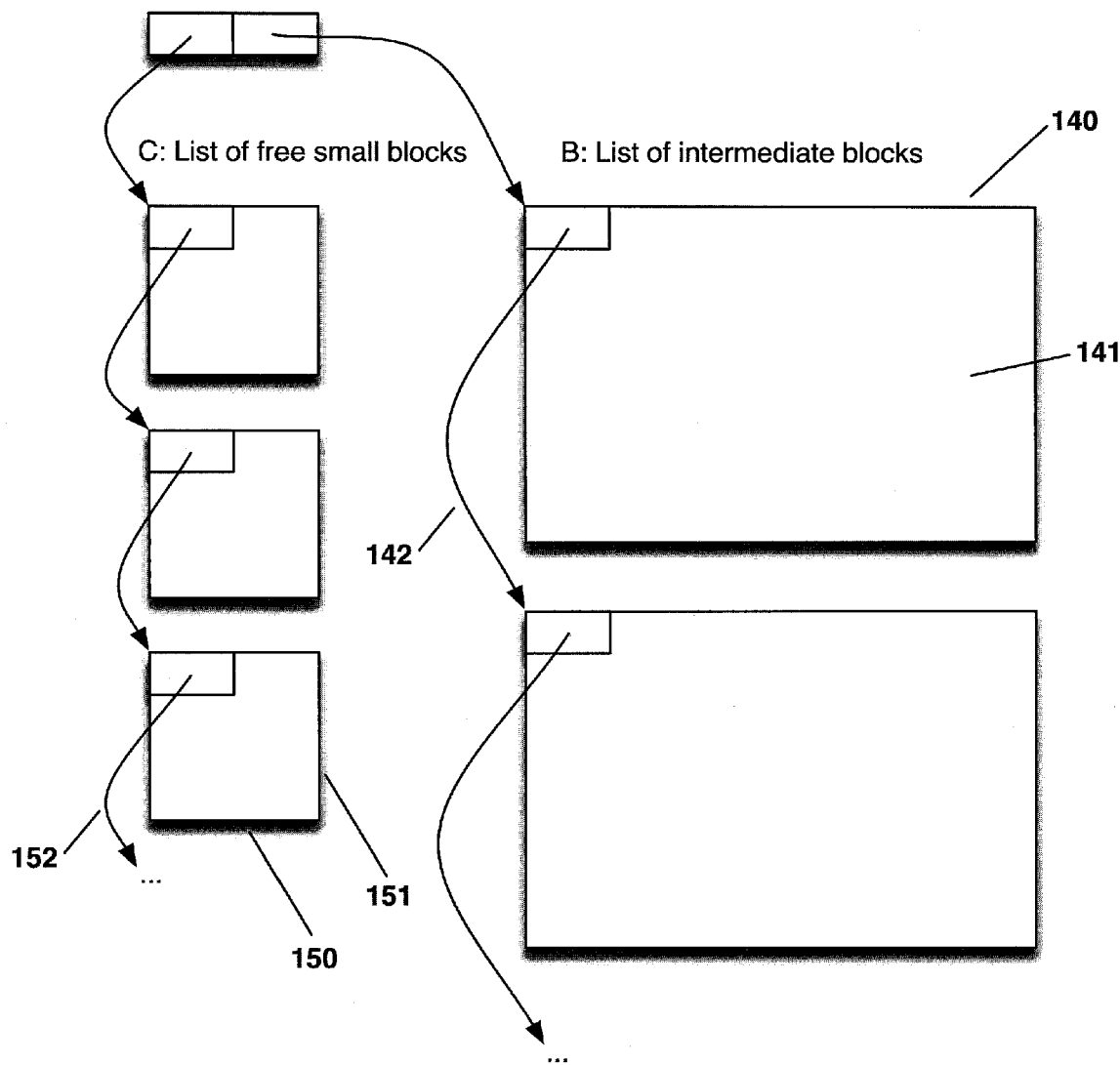
FIG. 2 is a block diagram illustrating a logical view of an intermediate block manager in accordance with an embodiment of the invention.
Figure 3:
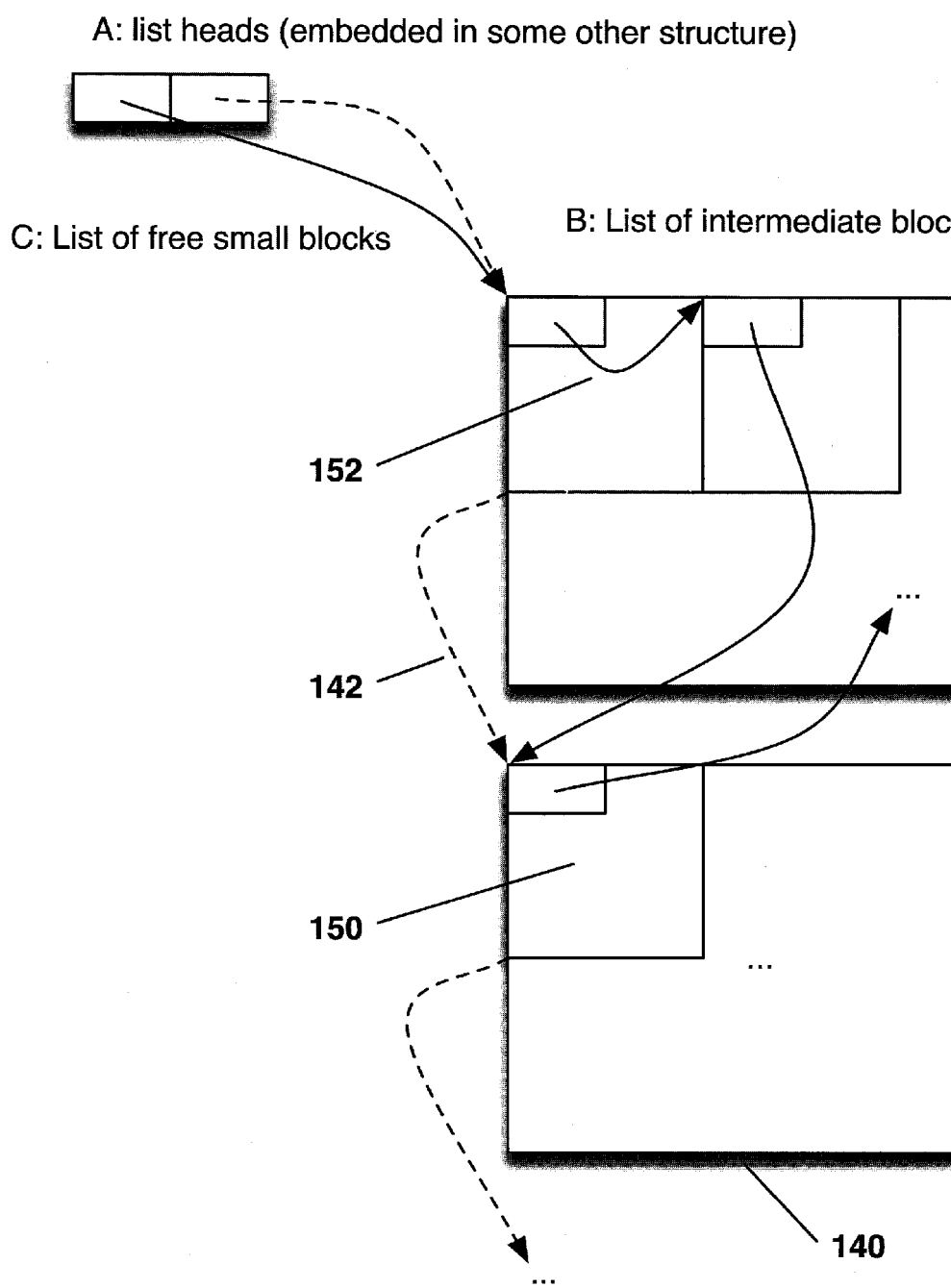
FIG. 3 is a block diagram illustrating a physical view of an intermediate block manager in accordance with an embodiment of the invention.

FIG. 2 is a block diagram illustrating a logical view of an intermediate block manager 200 in accordance with an embodiment of the invention. And, FIG. 3 is a block diagram illustrating a physical view of an intermediate block manager 200 in accordance with an embodiment of the invention. A collection of intermediate blocks 140 is managed by an "intermediate block manager" 200. As mentioned above, the intermediate blocks 140 being managed by one such manager all pertain to a single data structure and must all contain small blocks 150 of the same size. The intermediate block manager 200 has two lists which may be simple push-down lists, the first B of all the intermediate blocks 140 being managed, and the second C of all the free small blocks 150 contained in the managed intermediate blocks 140. The free small block list C may involve small blocks 150 contained in more than one intermediate block 140. Two list heads A may be embedded in some other structure for the two lists B, C. FIG. 2 presents a logical (i.e., conceptual) view of this. FIG. 3 reflects the physical layout in memory 330.

Note that the reduction or avoidance of memory compaction when using this method means that pointers 141, 151 to data structures 140 and their components 150 are generally valid for the lifetime of the data. This allows direct access of this information and so much higher performance than a data structure that performs memory compaction as such a data structure would have to provide an indirect data access mechanism (e.g., table lookup) since the address of a data element may change during compaction making simple pointers invalid.

Figure 4:
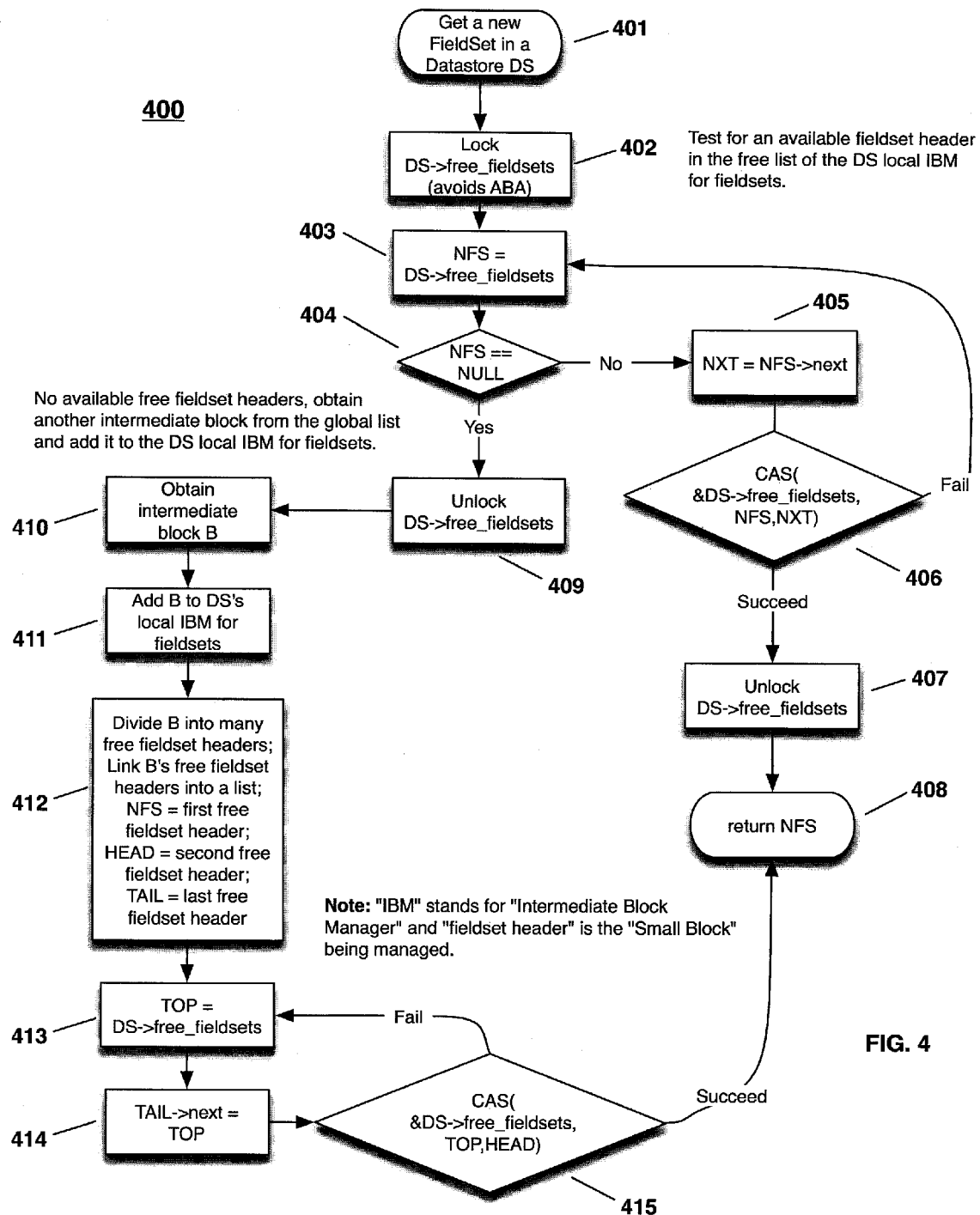
FIG. 4 is a flow chart illustrating operations of modules within the memory of a data processing system for obtaining a small block from an intermediate block manager, in accordance with an embodiment of the invention.
Figure 5:
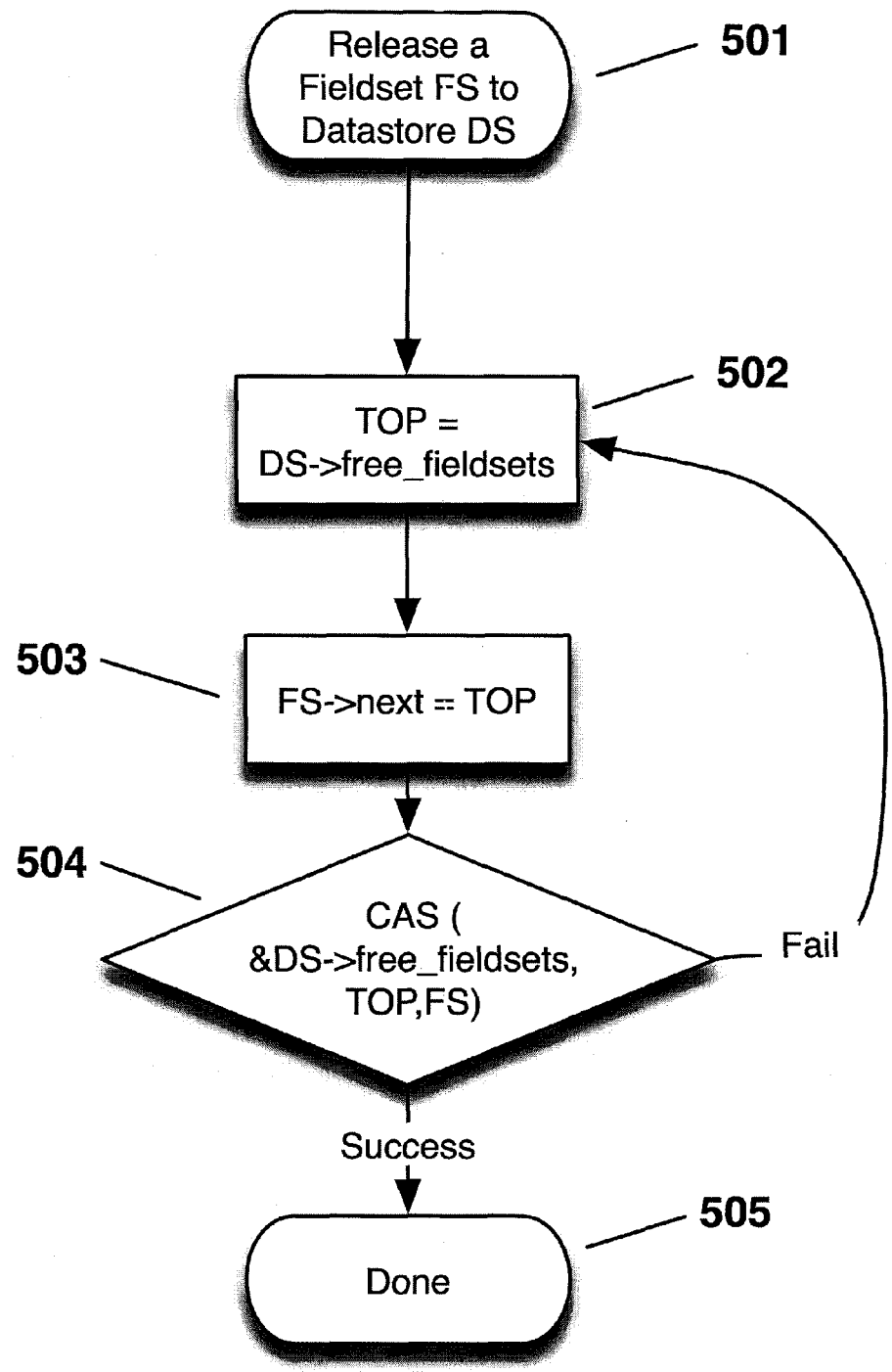
FIG. 5 is a flow chart illustrating operations of modules within the memory of a data processing system for returning a small block to an intermediate block manager free list, in accordance with an embodiment of the invention.

FIG. 4 is a flow chart illustrating operations 400 of modules 331, 333 within the memory 330 of a data processing system 300 for obtaining a small block 150 from an intermediate block manager 200, in accordance with an embodiment of the invention. And, FIG. 5 is a flow chart illustrating operations 500 of modules 331, 333 within the memory 330 of a data processing system 300 for returning a small block 150 to an intermediate block manager free list C, in accordance with an embodiment of the invention.

The following basic operations are provided relating to the intermediate block manager 200. First, an "obtaining a small block" operation is provided. A small block 150 is obtained by looking at the free small block list C for that intermediate block manager 200 and taking one small block 150 off that list C providing one exists as shown in FIG. 4. If not, a new intermediate block 140 is obtained from a free intermediate block list. This block 150 is added to the intermediate block list B for the manager 200, divided into appropriately sized small blocks 150, and all the small blocks 150 are added to the free small block list C. Second, a "returning a small block" operation is provided. A small block 150 is returned by pushing it onto the free small blocks list C of the intermediate block manger 200 as shown in FIG. 5. Third, a "releasing an entire intermediate block manager" operation is provided. In this operation, all of the intermediate blocks 140 in the list B managed by this intermediate block manager ("IBM") 200 are returned to the list of free intermediate blocks. This operation follows the same logic as shown in FIG. 5 except it uses intermediate blocks 140 instead of fields or small blocks 150 and the free intermediate block list instead of free small blocks.

Referring again to FIG. 1, a payload allocation block structure 120 is used for the storing of variable length data components such as data strings. Like with the tiered block allocation structure 110, a pool of payload allocation blocks 160 are obtained from the operating system 331 when the application 333 is first initialized. This may also occur dynamically in systems that are not as real-time critical. The size of these blocks 160 should typically be at least ten times larger than the largest payload that will be handled by the system 100. For example, in most monitoring applications, one Mbyte might be typical. Again, the allocation of fixed size blocks in this fashion minimizes the interaction with the operating system's memory management scheme and so reduces or avoids the allocation time, memory fragmentation, and compaction issues that would otherwise be encountered. The pool of payload allocation blocks 160 is kept in a circular list.

A payload allocation block 160 contains a pointer 161 to the next payload allocation block (kept as a circular list for the round robin), the head of an ordered free list structure (which may be an AVL tree, a "skip list", etc.), two sentinel sizes (set to zero) at the low and high end of the remaining space in the block 160, and one or more variable sized chunks (described below) between the sentinel sizes.

Figure 6:
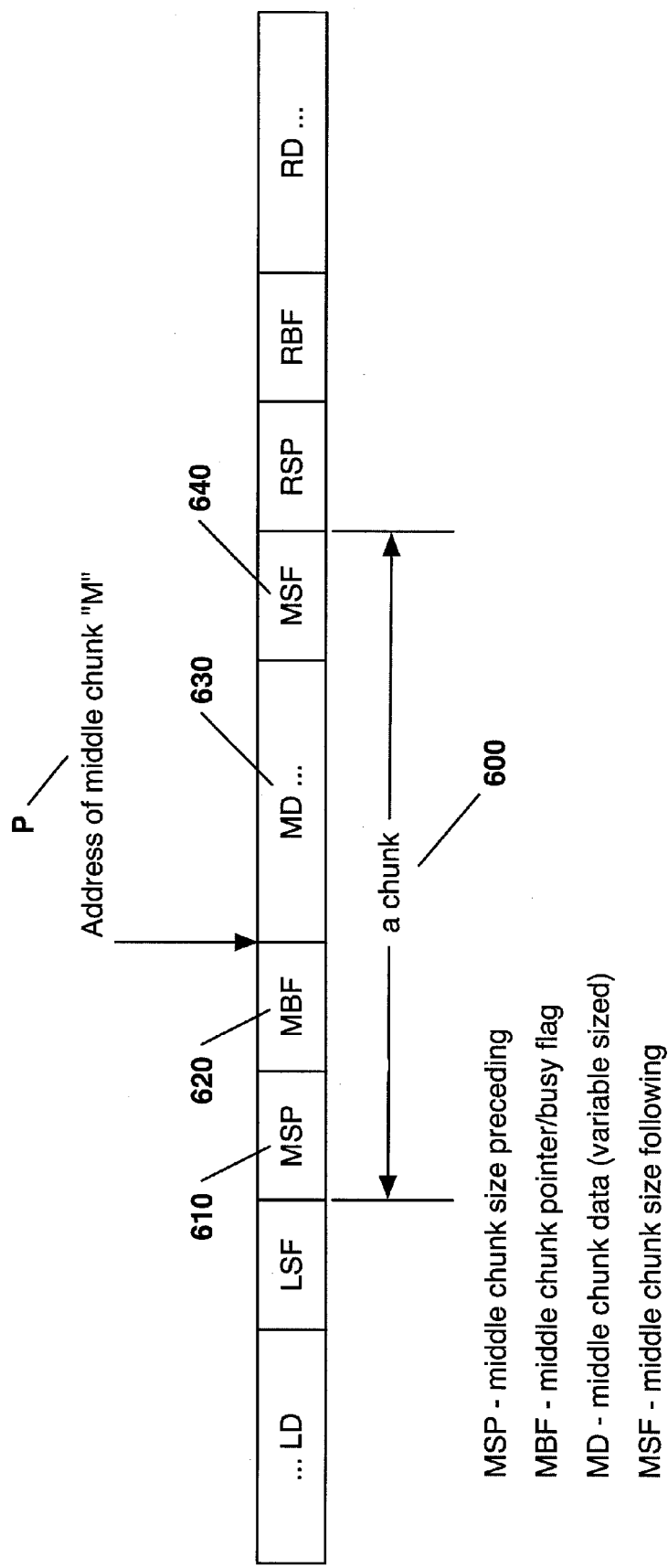
FIG. 6 is a block diagram illustrating a payload allocation block "chunk" in accordance with an embodiment of the invention.

FIG. 6 is a block diagram illustrating a payload allocation block "chunk" 600 in accordance with an embodiment of the invention. Each payload allocation block 160 also contains a small "free list" structure at its head. The rest of the payload allocation block 160 is divided up into a number of "chunks" 600, each of which may be of variable size. Each chunk 600 is preceded and followed by the size 610, 640 of that chunk 600 and contains a combined pointer/"free flag" 620 as shown in FIG. 6. Note that FIG. 6 shows three adjacent chunks ("L", "M", and "R"). This allows for very fast, constant time coalescing of free chunks when a chunk 600 is released since the chunks to either side can be accessed by a simple calculation as described below.

Let "p" be the address of the data portion 630 of the "middle chunk" ("MD"), then:
addressof(MBF 620)=p−sizeof(MBF)
addressof(MSP 610)=p−(sizeof(MBF)+sizeof(MSP))
addressof(MSF 640)=p+MSP
addressof(RD)=p+MSP+(sizeof(MSF)+sizeof(RSP)+sizeof(RBF))
addressof(LSF)=p−(sizeof(MBF)+sizeof(MSP)+sizeof(LSF))
addressof(LD)=addressof(LSF)−LSF The combined pointer/"free flag" 620 is set to NULL when a chunk 600 is free (i.e., unused), and points to the containing payload allocation block 160 when the chunk 600 is in use (as shown in FIG. 1). When a chunk (e.g., "M" 600) is released, the (non-NULL) pointer 620 is used to get the containing payload allocation block 160, the chunks on either side are examined to see if they are free (i.e., see if "LBF" or "RBF" are NULL) and are coalesced with "M" 600 by removing them from the free list and adjusting the sizes if they are. The resulting free chunk has its combined pointer/"free flag" 620 set to NULL and is then inserted into a size ordered free list structure for the containing payload allocation block 160. The size ordered free list structure can be any reasonably efficient ordered data structure such as an AVL tree or a skip list.

Memory allocation for variable sized data involves simply rotating through the list of payload blocks 160 looking for a space large enough to put the chunk 600. This is a small fixed time per payload block 160 as the information containing the largest chunk available is contained at the top of the ordered free list for the payload allocation block 160. To maximize the chances of an immediate hit, the allocation scheme is round robin. That is, a payload allocation block 160 is filled up to the extent possible and then the next payload allocation block 160 is selected, etc. Space that becomes available in payload allocation blocks 160 as a result of chunks 600 being released will be picked up on subsequent trips around the circular list of payload allocation blocks.

The invention makes use of the application specific knowledge common to most monitoring and data analyzing applications that most large payloads are transient and have similar lifetimes. This means that they are released (and coalesced into larger blocks of free space) in approximately the same order they are allocated. Therefore, when one payload allocation block 160 has been filled with active payloads a simple round robin approach will lead to the next payload allocation block 160 used for allocation being the one that has been "fallow" the longest and hence the most likely to have had more of its active payloads released and coalesced.

This method of payload block allocation 160 may have the following advantages. First, the allocation of large payload blocks minimizes the interaction with the operating system memory management scheme and so avoids the allocation time, memory fragmentation, and compaction issues that would otherwise be encountered. Second, the placement of the chunk size 610, 640 on both ends of the chunk data 630 allows for very fast, constant time coalescing of free chunks. Keeping the free list ordered is "O (log N)" time, but "N" is expected to be small because adjacent free chunks are coalesced.

The invention makes use of the fact that the application data structures of interest can be organized hierarchically with data elements or "fields" being contained within data structures or "field sets" to decide which parts of the application data should be managed by which intermediate block manager 200. Since field sets are typically operated on by one thread at a time and several of the fields are involved in the operation, each field set may have an intermediate block manager 200 for the fields belonging to that field set. This will mean that accessing one field will increase the probability of finding other fields from the same field set in the cache before they are needed (i.e., a cache "hit") because all of the memory adjacent to the first field is being used for other fields in the same field set. It will also mean that the probability of other threads interfering with the cache lines will decrease since no other application data is interspersed with the fields for the particular field set being operated on. Other threads may operate on other field sets, but their field data is segregated by being in other intermediate block managers 200. When the field set is released, all the intermediate blocks from its field intermediate block manager 200 can be completely released as well, since no other field set has fields in them.

Figure 7:
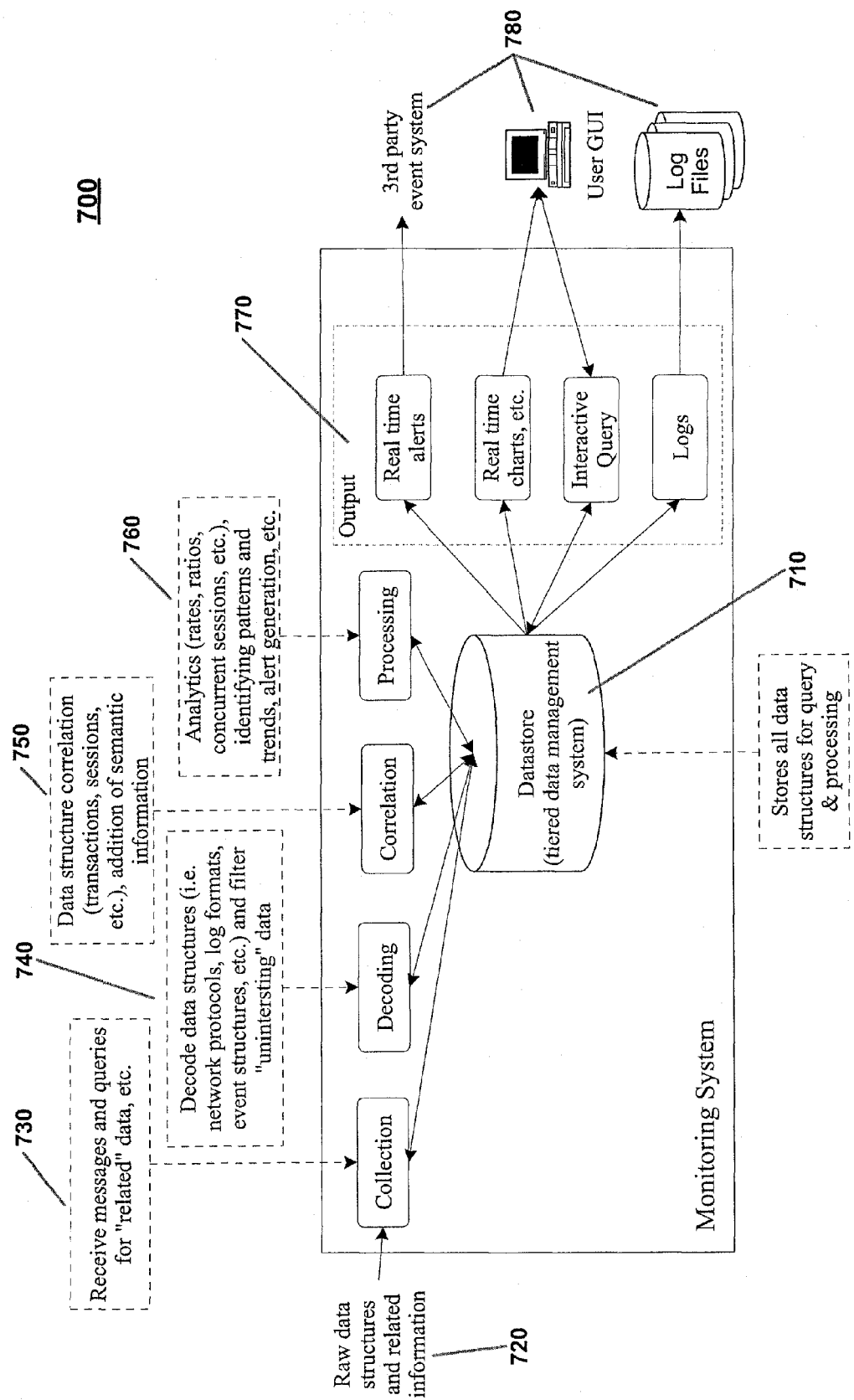
FIG. 7 is a block diagram illustrating an architecture for a real-time data monitoring application in accordance with an embodiment of the invention.

FIG. 7 is a block diagram illustrating an architecture for a real-time data monitoring application 700 in accordance with an embodiment of the invention. As mentioned above, the invention is useful for those applications that access large amounts of in-memory data which can be organized hierarchically (i.e., where distinct data elements or "fields" can be associated with higher level data structures or "field sets"). An example class of application of this type is one that does data monitoring combined with deep packet analysis. Examples of such applications include real-time message content switches, message format converters, fraud monitors, application firewalls, business process analysis applications, and network data analyzers. In these applications, the data that must be accessed consists of transaction "field sets". Transactions, in turn, consist of multiple application layer message "field sets". Messages often consist of multiple data packet "field sets". Data packets consist of multiple different "fields" containing the detailed network and application information.

The following is an example of how the invention may be used in such an application. In this example, real-time data would be acquired from a variety of sources such as networks, the message flow between application components, log files, databases, and directly from the business applications being monitored.

As shown in FIG. 7, the application 700 (or 333) would consist of a large "datastore" 710 that would contain all the received and decoded data, and one or more processing modules (e.g., programs) 730-760 which would manipulate the data. As well as the incoming data 720, the datastore 710 would store any structures or other data associated with the incoming data 720 (e.g., state information, statistics, correlation of messages into higher level entities, etc.). The processing modules 730-760 would take the data 720 and process it via a number of steps as shown in FIG. 7.

The processing modules 730-760 in this example application 700 include the following. First, a collection module 730 is provided for the collection of the raw data structures or data 720. These data structures 720 may be network data fragments, data packets, messages, log file entries, etc. The collection module 730 may also involve querying databases or otherwise acquiring additional data structures which will assist in adding meaning to the monitored data structures (e.g., mapping a numeric identifier to a name, etc.). Second, a decoding module 740 is provided for decoding of the raw data structures 720 to get access to the individual data components within them. These data components may be XML data elements and attributes, protocol header fields, application message data fields, fields within a log message, etc. As part of this step, non-relevant data will also be filtered. Third, a correlation module 750 is provided for correlation of the data structures and related data fields into higher level entities such as sessions, transactions, and/or business processes. Fourth, a processing module 760 is provided for performing computations on the data structures, data fields, and correlated entities to produce information such as rates, concurrency, and durations of different operations and fields, etc. It may also involve looking for different patterns, modifying the raw data structure in some way, or creating new data structures based on the received data. Fifth, an output module 770 is provided for outputting information in a wide range of formats. Output 780 may be by event streaming to sinks such as a real-time displays, data historians, databases, log files, downstream applications, etc. Output 780 may also be by interactive query, meaning that the data must be stored for some period of time in order to be accessible when requested and that it may be necessary to do further processing of the data based on the query. The data that is output may be any subset of the data received and processed, including the raw input data structure, a modified version of the structure, individual data components within it, higher level data structures such as transaction information, and/or the results from processing the data.

Accomplishing these tasks in real-time involves having the data readily available so that different entities can process it quickly and in parallel. Furthermore, large amounts of data will be received so the datastore 710 must support real-time access to large quantities of data.

The present invention serves this application 700 well as there is a large amount of in-memory data which can be organized hierarchically. For example, overlying "field sets" consisting of transactions, can be divided into lower level "field sets" consisting of messages, etc. At the bottom layer are data elements (i.e., "fields") which are the individual data fields within the message or other type of field set (e.g., sets of statistics, application component states, etc.).

The present invention may be used to implement the datastore 710 in such an application 700 as follows. Each big block 130 is divided into many intermediate blocks 140. One or more intermediate block managers 200 are set up using these intermediate blocks 140 (including one to manage the intermediate blocks themselves). Other intermediate block managers 200 manage field sets, field set collections, field set cursors, and field set collection cursors. Each field set contains another intermediate block manager 200 for managing fields directly associated with the field set. Similarly each field set collection, cursor, and field set collection cursor has one or more intermediate block managers 200 for managing its components. Thus, each intermediate block manager 200 is responsible for managing some collection of other data components (i.e., either small blocks 150 or other intermediate blocks 140). It contains two lists as follows: first, a list B of all the intermediate blocks 140 containing components being managed by that that intermediate block manager 200; and, second, a free list C of all unused components 150. The payload allocation blocks 160 each contain variable sized chunks 630 of data where each chunk 630 is a variable length portion of a network packet being assembled or disassembled.

To complete the description of the application 700, each field set consists of the following: an intermediate block manager 200 for managing fields (e.g., IP address, etc.) of this field set; an intermediate block manager 200 for managing a dictionary or a hash table of the fields; a dictionary; and, a reference count indicating how many external references there are to this field set.

Given this architecture, the following is a description of the major datastore access "field set" and "field" operations that are provided as well as supporting "field set collection" and "cursor" operations. Note that the datastore 710 contains structures which are not explicitly described herein as these represent additional examples of the structures that are described herein.

The following basic operations are provided relating to field sets. First, a "creation" operation is provided. With the creation operation, a small block 150 is obtained from the datastore's field set intermediate block manager 200 (as shown in FIG. 4) and it is initialized as a field set. It is then added to a distinguished collection of all active field sets. Second, a "deletion" operation is provided. With the deletion operation, the field set is removed from the datastore's distinguished collection of active field sets. Any variable data stored in payload allocation blocks 160, field sets, and field set collections referenced by fields in the field set are released. All intermediate blocks 140 from the field set's "field intermediate block manager" 200 are returned to the datastore's free intermediate block list. And, the field set header is returned to the datastore's field set intermediate block manager 200 as shown in FIG. 5.

With respect to "field operations", fields are the individual data fields within a field set. Fields may consist of an element of a message (e.g., the entire monitored message payload, a decoded field within a monitored data message, etc.) or a field created by the application 700 (e.g., a statistic, application component state, etc.). The following basic operations are provided relating to fields. First, a "creation" operation is provided. With this operation, a small block 150 is obtained from the field set's field intermediate block manager 200. The small block 150 is initialized as a field. And, the new field is added to the field set's dictionary. Second, a "reading" operation is provided. With this operation, the field is looked-up in the field set's dictionary and the value is returned. Third, a "writing" operation is provided. With this operation, the field is looked-up in the field set's dictionary and the value is set. Fourth, a "deletion" operation is provided. With this operation, the field is marked as deleted. And, any value held by the field that needs releasing is released.

With respect to "field set collection operations", a field set collection consists of a dictionary of fields sets. A field set collection may, for example, contain all the field sets (e.g., messages) comprising a transaction including field sets created by the user that add context to the transaction. The following basic operations are provided relating to field set collections. First, a "creating field set collections" operation is provided. This is the same as the field set creations operation except the operation is carried out on the datastore's "field set collection intermediate block manager" 200 and it is not added to any distinguished collection. Second, an "adding field sets" operation is provided. With this operation, the field set collection's dictionary is added to and the field set's reference count is increased. Third, a "deleting field sets" operation is provided. With this operation, the field set collection's dictionary is removed from and the field set's reference count is reduced. In addition, the field set itself is deleted if the reference count drops to zero. Fourth, a "field set lookup" operation is provided. With this operation, the field set collection's dictionary is searched. Fifth, a "deleting field set collections" operation is provided. With this operation, all remaining field sets in the dictionary are deleted. The field set collection is returned to the free small block list of the data store's "field set" collection intermediate block manager" 200.

With respect to "cursor operations", cursors are used for iterating through fields in a field set and the field sets in a collection. They are used for doing a tree traversal through one field set or collection. The following basic operations are provided relating to cursors. First, a "creation" operation is provided. With this operation, the reference count of the object the cursor applies to is incremented, then a small block 150 is obtained from the appropriate intermediate block manager 200 in the data store 710 and it is initialized as a cursor, the reference to the object the cursor applies to is saved, and then the cursor's current position is set to the starting position. Second, a "deletion" operation is provided. With this operation, the reference count of the object the cursor applies to is decremented and that object is released if appropriate, then the cursor is returned to the free small block list of the appropriate intermediate block manager 200 in the datastore 710. Third, a "cursor movement" operation is provided. With this operation, a reference to the object at the current position is saved to be used as the result (this may be NULL if at the end of the set of possibilities). The cursor's next position is calculated based on the cursor's current position and it is saved as the new current position. In addition, the reference saved above is returned.

Referring to FIGS. 4 and 7, the operations 400 of modules 331, 333, 700 within the memory 330 of a data processing system 300 for obtaining a small block 150 from an intermediate block manager 200, will now be described in more detail.

At step 401, the operations 400 start and a new field set consisting of a "field set header" and more fields attached separately ("FS") in a datastore ("DS") is obtained. Each field set header in a datastore (say, pointed at by a variable DS) is an instance of a "small block" 150, to be obtained from an Intermediate Block Manager ("IBM") 200 specific to the DS, consisting of two list heads A (as illustrated in FIGS. 2 and 3) which will be referred to as "DS→free_fieldsets" (for small blocks C) and "DS→fieldset_blocks" (for intermediate blocks B) in the following.

At step 402, the DS→free_fieldsets is locked to avoid the "ABA" problem. A lock-free pushdown list algorithm (for pushdown lists like the two in an IBM 200) must use some mechanism to avoid what is known as the "ABA problem" when removing (i.e., "popping") an element from the list. There are several possible methods (e.g., "hazard pointers", use of a "double" compare-and-swap ("DCAS") instruction (i.e., comparing and swapping double the size of a pointer), etc.). According to one embodiment, a simple mutex lock (so that the operation is not completely lock-free) is used because the expected use pattern makes it the most cost effective method to provide acceptable results. This step obtains exclusive access to the head of the free list of small blocks (i.e., fields) in the IBM 200 with respect to any other process attempting to obtain a new field set for the DS.

At step 403, the pointer 152 to the first small block (i.e., field set header) in the free list (or NULL if the list is empty) is copied into a local variable "NFS" (i.e., NFS=DS→free_fieldsets).

At step 404, the value of the variable NFS is tested to see if there is at least one small block (i.e., field set header) in the list (i.e., NFS=NULL). If NFS is NULL, there are no available small blocks and processing continues to step 409, otherwise processing continues to step 405.

At step 405, if NFS is not NULL, then it points to a usable small block (i.e., field set header), so copy the pointer in NFS→next to the local variable "NXT" (i.e., NXT=NFS→next) in preparation for attempting to remove it from the free list.

At step 406, perform a (single) compare-and-swap ("CAS") operation on the head of the free list of small blocks (DS→free_fieldsets) replacing the current value with the value from NXT if the current value is still equal to the value in NFS (i.e., attempting to "pop" NFS from the list) (i.e., CAS(&DS→free_fields, NFS, NXT)). This operation can either succeed or fail. If it fails it does so because some other process returned a small block (i.e., field set header) to the IBM 200 (changing the head of the free list) as shown in FIG. 5, or in step 415 herein, so the process must start over from step 403 and get a fresh copy of the head of the free list.

At step 407, if step 406 has succeeded, then the entire operation has successfully obtained exclusive possession of the small block (i.e., field set header) pointed at by NFS and removed it from the free list of the IBM 200, so it may now safely relinquish the mutex lock obtained in step 402 (i.e., Unlock DS→free_fieldsets).

At step 408, the operations 400 end and the pointer to the new small block (i.e., field set header) is in the variable NFS (i.e., Return NFS).

At step 409, the value in variable NFS is NULL, the IBM 200 is out of available small blocks (i.e., field set headers), so release the mutex lock obtained in step 402 to avoid holding it during the potentially lengthy process of obtaining more small blocks (steps 410 through 415), since it is possible for other processes to return and then get small blocks (i.e., field set headers) while it is happening (i.e., Unlock DS→free_fieldsets).

At step 410, an intermediate block 140 is obtained. Get a free intermediate block 140 using operations similar to those of FIG. 4, but applied to the global list of free intermediate blocks B.

At step 411, the intermediate block 140 is added to datastore's local IBM 200 for field sets. The intermediate block 140 is added to the list for the IBM 200 managing datastore's field sets (i.e., DS→fieldset_blocks, as mentioned in step 401). This may be performed using a standard lock-free "push" operation.

At step 412, the intermediate block 140 is divided into free field set headers. The intermediate block 140 is divided into as many "field set header"-sized small blocks 150 as will fit, the pointer to the first one in the variable NFS is saved, and the remaining small blocks are linked into a list with the local variable HEAD pointing to the first small block in the list and the local variable TAIL pointing to the last small block in the list. This is in preparation for attempting to do a lock-free "push" of the entire list of remaining small blocks onto the IBM's small block list (DS→free_fieldsets) in steps 413 through 415 described below.

At step 413, the pointer to the first small block (i.e., field set header) 150 in the IBM's free small block list (or NULL if the list is empty) is copied into local variable TOP (i.e., TOP=DS→free_fieldsets).

At step 414, the pointer in TOP is copied to TAIL→next (i.e., TAIL→next=TOP) so that the list of small blocks (i.e., field set headers) created in step 412 now continues on with the list of free small blocks C (i.e., fields).

At step 415, a (single) compare-and-swap operation is performed on the head of the free list of small blocks C (DS→free_fieldsets) replacing the current value with the value from HEAD if the current value is still equal to the value in TOP (i.e., attempt to "push" the list of small blocks from step 412 onto the list) (i.e., CAS(&DS→free_fieldsets, TOP, HEAD)). This operation can either succeed or fail. If it fails (because some other process has changed the top of the free list), go back to step 413 and start the lock-free "push" attempt over. If it succeeds, the variable NFS points at one small block (i.e., field set header) 150 from step 412 belonging exclusively to this process and the remaining small blocks from step 412 have been safely added to the IBMs small block list, so go to step 408 where the operations 400 end.

Referring to FIGS. 5 and 7, the operations 500 of modules 331, 333, 700 within the memory 330 of a data processing system 300 for returning a small block 150 to an intermediate block manager free list C, will now be described in more detail.

At step 501, the operations 500 start and a field set header or small block 150 in the datastore set DS is released. A no longer needed small block (i.e., a field set header, say, pointed at by a variable "FS") 150 is returned to the IBM 200 managing the datastore's field set headers. That IBM 200 consists of the two list heads A (as illustrated in FIGS. 2 and 3), DS→free_fieldsets (for small blocks 150) and DS→fieldset_blocks B (for intermediate blocks 140). FS 150 must be returned to the IBM 200 it was obtained from since it is actually inside one of the intermediate blocks 140 still held in that IBM's intermediate block list B as shown in FIG. 3. This entire process is a standard lock-free pushdown list "push" operation.

At step 502, the pointer to the first small block (i.e., field set header) in the free list (or NULL if the list is empty) C is copied into local variable TOP (i.e., TOP=DS→free_fieldsets).

At step 503, the pointer in TOP is copied to FS→next (i.e., FS→next=TOP) so that the single element list of small blocks (i.e., field set headers) FS now continues on with the list of free small blocks (fields) C for the IBM 200.

At step 504, a (single) compare-and-swap operation is performed on the head of the free list of small blocks C (DS→free_fieldsets) replacing the current value with the value from FS if the current value is still equal to the value in TOP (i.e., attempt to "push" the small block pointed to by FS onto the list) (i.e., CAS(&DS→free_fieldsets, TOP, FS)). This operation can either succeed or fail. If it fails (i.e., because some other process has changed the top of the free list), go back to step 502 and start the lock-free "push" attempt over. If it succeeds, the small block (i.e., field set header) FS has been returned to the IBM's small block list.

At step 505, the operations 500 end.

The invention may provide one or more of the following advantages: (A) Reduced or no memory compaction which has the advantage of eliminating the slowdowns that occur during periodic garbage collection; (B) Reduced or no memory fragmentation which results in no data compaction being necessary and so eliminates the slow downs that occur during that process; (C) Reduced cache thrashing which results in efficient use of multi-core processor memory caches; (D) Increased cache hits which results in efficient use of multi-core processor memory caches; (E) Efficient distribution of application components between the processor cores which results in efficient use of the processor cores; and, (F) Direct data access which results in very high speed operation. Aspects of the invention may be related to the above advantages as follows. First, a pool of intermediate blocks 140 that are all the same size are provided (advantages A and B). Second, a pool of intermediate blocks 140 that are multiples of the cache line size are provided (advantages C and D). Third, pools of small blocks 150 within intermediate block managers 200 that are all the same size are provided (advantage B). Fourth, pools of small blocks 150 that are segregated by identical size are provided (advantages A and B). Fifth, pools of small blocks 150 that are segregated by use are provided (advantages C and D). Sixth, segregation of small blocks 150 based on expected thread use is provided (advantage E). Seventh, the potential use of lock-free algorithms is provided (advantage E). Eighth, direct data access by pointers for application components is provided (advantage F). Ninth, separation of fixed sized data from variable sized data with the fixed sized data in the small blocks 150 and the variable sized data managed elsewhere (e.g., 160) is provided (advantage F).

The method of the invention may be further illustrated with the aid of a simplified flowchart.

Figure 9:
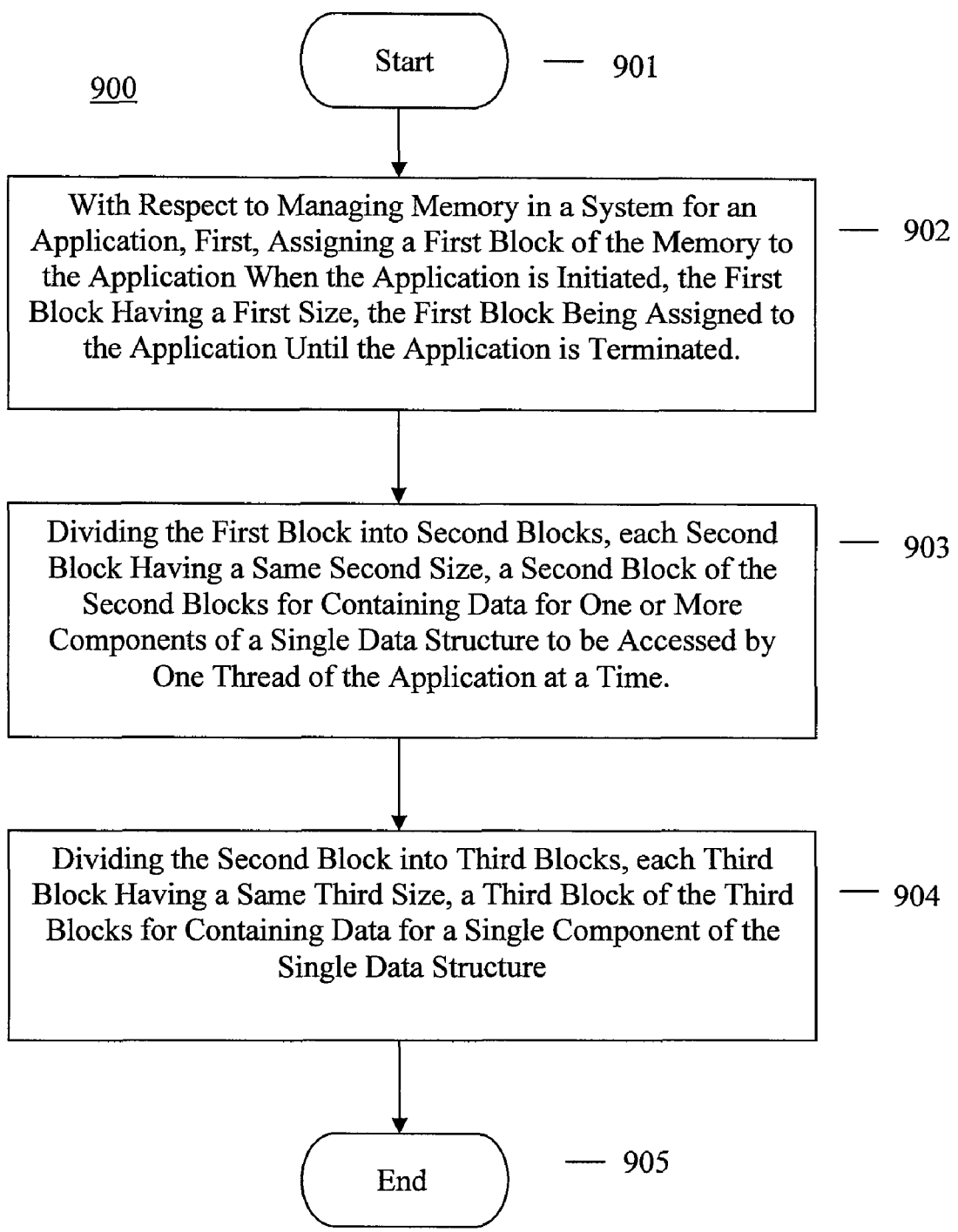

FIG. 9 is a flow chart illustrating operations 900 of modules 321, 331 within a data processing system 300 for managing memory 330 in the system 300 for an application 333, 700, in accordance with an embodiment of the invention.

At step 901, the operations 900 start.

At step 902, a first block (i.e., a big block) 130 of the memory 330 is assigned to the application 333, 700 when the application 333, 700 is initiated, the first block 130 having a first size, the first block 130 being assigned to the application 333, 700 until the application 333, 700 is terminated.

At step 903, the first block 130 is divided into second blocks (i.e., intermediate blocks) 140, each second block 140 having a same second size, a second block 140 of the second blocks 140 for containing data for one or more components (e.g., fields) of a single data structure (e.g., a field set) to be accessed by one thread of the application 333, 700 at a time.

At step 904, the second block 140 is divided into third blocks (i.e., small blocks) 150, each third block 150 having a same third size, a third block 150 of the third blocks 150 for containing data for a single component of the single data structure.

At step 905, the operations 900 end.

The method may further include: associating a block manager (i.e., an intermediate block manager) 200 with the second block 140 for dividing the second block 140 into the third blocks 150. Each second block 140 may be associated with a respective block manager 200. The same third size of each third block 150 of the second block 140 may differ from a same third size of each third block 150 of another of the second blocks 140. The method may further include: if the single component is associated with variable length data: assigning a fourth block (i.e., a payload allocation block) 160 of the memory 330 to the application 333, 700 when the application is initiated, the fourth block 160 having a fourth size, the fourth block 160 being assigned to the application 333, 700 until the application is terminated; dividing the fourth block 160 into portions (i.e., chunks) 600, each portion 600 having a variable size 630, the variable size 630 being indicated at both a start 610 and an end 640 of the portion 600; and, establishing a pointer 170 from the third block 150 to a portion 600 of the fourth block 160, the portion 600 for containing the variable length data of the single component, the third block 150 for containing the pointer 170. The method may further include: maintaining a list of second blocks B within the first block 130 that are empty; identifying the second block 140 from the list of second blocks B as being empty; storing data for the single data structure in the second block 140 when required by the application 333, 700 and removing the second block 140 from the list of second blocks B; and, deleting the data for the single data structure from the second block 140 when no longer required by the application 333, 700 and adding the second block 140 to the list of second blocks B. The method may further include: maintaining a list of third blocks C within the second block 140 that are empty; identifying the third block 150 from the list of third blocks C as being empty; storing data for the single component in the third block 150 when required by the application 333, 700 and removing the third block 150 from the list of third blocks C; and, deleting the data for the single component from the third block 150 when no longer required by the application 333, 700 and adding the third block 150 to the list of third blocks C. In the above method, the first size may be greater than the second size and the second size may be greater than the third size. The second size may be an integer multiple of a cache line size of a cache memory of a processor core (e.g., 320) of the system 300. The list of second blocks B may be a push-down list and each second block 140 may contain a pointer 142 for use by the list of second blocks B and a data region 141. The list of third blocks C may be a push-down list and each third block 150 may contain a pointer 152 for use by the list of third blocks C and a data region 151. A data region 151 of the third block 150 may contain the data for the single component if the data for that component is fixed-length data. A data region 151 of the third block 150 may include a pointer 170 to another location 120, 600 in the memory 330 for storing the data for the single component if the data for that component is variable-length data. The application 333 may be a message monitoring application 700, the single data structure may be associated with a message, and the single component may be associated with a field of the message containing network and/or application information. The method may further include extracting data from the message and storing the data in the second and third blocks 140, 150. The application 333, 700 may have two or more threads. The system 300 may have two or more processor cores 320, each processor core 320 running only one of the two or more threads at a time. And, the memory 330 may be a cache memory of a processor core 320 of the system 300.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a prerecorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 can be contained in a data carrier product according to one embodiment. This data carrier product can be loaded into and run by the data processing system 300. In addition, the sequences of instructions which when executed cause the method described herein to be performed by the data processing system 300 can be contained in a computer software product (e.g., software modules 331, 333, 700) according to one embodiment. This computer software product can be loaded into and run by the data processing system 300. Furthermore, the sequences of instructions which when executed cause the method described herein to be performed by the data processing system 300 can be contained in an integrated circuit product (e.g., hardware modules 321) including a coprocessor or memory according to one embodiment. This integrated circuit product can be installed in the data processing system 300. Moreover, the sequences of instructions which when executed cause the method described herein to be performed can be contained in an integrated circuit product (e.g., hardware modules 321, a field programmable gate array ("FPGA"), an application specific integrated circuit ("ASIC"), etc.) according to one embodiment. This integrated circuit product can be installed in the data processing system 300.

The embodiments of the invention described above are intended to be exemplary only. Those skilled in this art will understand that various modifications of detail may be made to these embodiments, all of which come within the scope of the invention.

What is claimed is:

1. A method for managing memory in a system for an application, comprising:
    assigning a first block of the memory to the application when the application is initiated, the first block having a first size, the first block being assigned to the application until the application is terminated;
    dividing the first block into second blocks, each second block having a same second size, a second block of the second blocks for containing data for one or more components of a single data structure to be accessed by one thread of the application at a time;
    dividing the second block into third blocks, each third block having a same third size, a third block of the third blocks for containing data for a single component of the single data structure; and,
    if the single component is associated with variable length data:
        assigning a fourth block of the memory to the application when the application is initiated, the fourth block having a fourth size, the fourth block being assigned to the application until the application is terminated;
        dividing the fourth block into portions, each portion having a variable size, the variable size being indicated at both a start and an end of the portion; and,
        establishing a pointer from the third block to a portion of the fourth block, the portion for containing the variable length data of the single component, the third block for containing the pointer.

2. The method of claim 1 and further comprising associating a block manager with the second block for dividing the second block into the third blocks.

3. The method of claim 2 wherein each second block is associated with a respective block manager.

4. The method of claim 1 wherein the same third size of each third block of the second block differs from a same third size of each third block of another of the second blocks.

5. The method of claim 1 and further comprising:
    maintaining a list of second blocks within the first block that are empty;
    identifying the second block from the list of second blocks as being empty;
    storing the data for the single data structure in the second block when required by the application and removing the second block from the list of second blocks; and,
    deleting the data for the single data structure from the second block when no longer required by the application and adding the second block to the list of second blocks.

6. The method of claim 5 wherein the list of second blocks is a push-down list and wherein each second block contains a pointer for use by the list of second blocks and a data region.

7. The method of claim 1 and further comprising:
    maintaining a list of third blocks within the second block that are empty;
    identifying the third block from the list of third blocks as being empty;
    storing the data for the single component in the third block when required by the application and removing the third block from the list of third blocks; and,
    deleting the data for the single component from the third block when no longer required by the application and adding the third block to the list of third blocks.

8. The method of claim 7 wherein the list of third blocks is a push-down list and wherein each third block contains a pointer for use by the list of third blocks and a data region.

9. The method of claim 8 wherein a data region of the third block contains the data for the single component if the data for that component is fixed-length data.

10. The method of claim 8 wherein a data region of the third block includes a pointer to another location in the memory for storing the data for the single component if the data for that component is variable-length data.

11. The method of claim 1 wherein the first size is greater than the second size and wherein the second size is greater than the third size.

12. The method of claim 11 wherein the second size is an integer multiple of a cache line size of a cache memory of a processor core of the system.

13. The method of claim 1 wherein the application is a message monitoring application, wherein the single data structure is associated with a message, and wherein the single component is associated with a field of the message containing at least one of network information and application information.

14. The method of claim 13 and further comprising extracting data from the message and storing the data in the second and third blocks.

15. The method of claim 1 wherein the application has two or more threads.

16. The method of claim 15 wherein the system has two or more processor cores, each processor core running only one of the two or more threads at a time.

17. The method of claim 1 wherein the memory is a cache memory of a processor core of the system.

18. A system for managing memory for an application, comprising:
    a processor core coupled to the memory; and,
    at least one of hardware and software modules within the memory and controlled or executed by the processor, the modules including:
    a module for assigning a first block of the memory to the application when the application is initiated, the first block having a first size, the first block being assigned to the application until the application is terminated;
    a module for dividing the first block into second blocks, each second block having a same second size, a second block of the second blocks for containing data for one or more components of a single data structure to be accessed by one thread of the application at a time;
    a module for dividing the second block into third blocks, each third block having a same third size, a third block of the third blocks for containing data for a single component of the single data structure; and,
    a module for, if the single component is associated with variable length data: assigning a fourth block of the memory to the application when the application is initiated, the fourth block having a fourth size, the fourth block being assigned to the application until the application is terminated; dividing the fourth block into portions, each portion having a variable size, the variable size being indicated at both a start and an end of the portion; and, establishing a pointer from the third block to a portion of the fourth block, the portion for containing the variable length data of the single component, the third block for containing the pointer.

19. The system of claim 18 and further comprising a module for associating a block manager with the second block for dividing the second block into the third blocks.

20. The system of claim 19 wherein each second block is associated with a respective block manager.

21. The system of claim 18 wherein the same third size of each third block of the second block differs from a same third size of each third block of another of the second blocks.

22. The system of claim 18 and further comprising:
a module for maintaining a list of second blocks within the first block that are empty;
a module for identifying the second block from the list of second blocks as being empty;
a module for storing the data for the single data structure in the second block when required by the application and removing the second block from the list of second blocks; and,
a module for deleting the data for the single data structure from the second block when no longer required by the application and adding the second block to the list of second blocks.

23. The system of claim 22 wherein the list of second blocks is a push-down list and wherein each second block contains a pointer for use by the list of second blocks and a data region.

24. The system of claim 18 and further comprising:
a module for maintaining a list of third blocks within the second block that are empty;
a module for identifying the third block from the list of third blocks as being empty;
a module for storing the data for the single component in the third block when required by the application and removing the third block from the list of third blocks; and,
a module for deleting the data for the single component from the third block when no longer required by the application and adding the third block to the list of third blocks.

25. The system of claim 24 wherein the list of third blocks is a push-down list and wherein each third block contains a pointer for use by the list of third blocks and a data region.

26. The system of claim 25 wherein a data region of the third block contains the data for the single component if the data for that component is fixed-length data.

27. The system of claim 25 wherein a data region of the third block includes a pointer to another location in the memory for storing the data for the single component if the data for that component is variable-length data.

28. The system of claim 18 wherein the first size is greater than the second size and wherein the second size is greater than the third size.

29. The system of claim 28 wherein the second size is an integer multiple of a cache line size of a cache memory of a processor core of the system.

30. The system of claim 18 wherein the application is a message monitoring application, wherein the single data structure is associated with a message, and wherein the single component is associated with a field of the message containing at least one of network information and application information.

31. The system of claim 30 and further comprising a module for extracting data from the message and storing the data in the second and third blocks.

32. The system of claim 18 wherein the application has two or more threads.

33. The system of claim 32 wherein the system has two or more processor cores, each processor core running only one of the two or more threads at a time.

34. The system of claim 18 wherein the memory is a cache memory of the processor core of the system.

* * * * *